United States Patent [19]
Richter et al.

[11] Patent Number: 5,616,308
[45] Date of Patent: Apr. 1, 1997

[54] PROCESS FOR PRODUCING AN OXYGEN-FREE OR LOW-OXYGEN, HIGH-TEMPERATURE RESISTANT SHAPED ARTICLE OF SILICON CARBIDE

[75] Inventors: Robin Richter, Hilbersdorf; Hans-Peter Martin; Gerhard Roewer, both of Freiberg; Eberhard Mueller, Jena; Hans Kraemer, Hilbersdorf; Peter Sartori, Rheinberg; Andreas Oelschlaeger; Wolfgang Habel, both of Ruhr; Bernhard Harnack, Duisburg, all of Germany

[73] Assignee: Solvay Deutschland GmbH, Hanover, Germany

[21] Appl. No.: 393,618

[22] Filed: Feb. 22, 1995

[30] Foreign Application Priority Data

Feb. 22, 1994 [DE] Germany .......................... 44 05 603.6

[51] Int. Cl.⁶ .................................. C01B 31/36
[52] U.S. Cl. .......................... 423/345; 501/88; 525/474; 525/478
[58] Field of Search .............. 423/345; 501/88; 525/474, 478

[56] References Cited

U.S. PATENT DOCUMENTS

| | | | |
|---|---|---|---|
| 4,052,430 | 10/1977 | Yajima et al. | 260/448.2 D |
| 4,100,233 | 7/1978 | Yajima et al. | 423/345 |
| 4,220,600 | 9/1980 | Yajima et al. | 556/434 |
| 4,283,376 | 8/1981 | Yajima et al. | 423/345 |
| 4,737,552 | 4/1988 | Baney et al. | 525/478 |
| 5,087,685 | 2/1992 | Sartori et all. | 528/25 |
| 5,132,375 | 7/1992 | Satori et al. | 525/474 |
| 5,171,722 | 12/1992 | Toreki et al. | 501/88 |
| 5,204,434 | 4/1993 | Sartori et al. | 528/14 |
| 5,247,028 | 9/1993 | Sartori et al. | 525/474 |

FOREIGN PATENT DOCUMENTS

| | | |
|---|---|---|
| 251678 | 1/1988 | European Pat. Off. . |
| 496574 | 7/1992 | European Pat. Off. . |
| 139257 | 5/1995 | European Pat. Off. . |
| 4207299 | 11/1993 | Germany . |
| 1-156509 | 6/1989 | Japan . |

*Primary Examiner*—Ferris Lander
*Assistant Examiner*—Amy M. Harding
*Attorney, Agent, or Firm*—Evenson, McKeown, Edwards & Lenahan P.L.L.C.

[57] ABSTRACT

A process for producing oxygen-free or low-oxygen shaped bodies of silicon carbide, particularly SiC fibers, by using chemically reactive polysilanes and/or polycarbosilanes as precursors. In accordance with the invention green fibers are stabilized preferably in the presence of reactive gases.

20 Claims, 1 Drawing Sheet

PROCESS FOR PRODUCING AN OXYGEN-FREE OR LOW-OXYGEN, HIGH-TEMPERATURE RESISTANT SHAPED ARTICLE OF SILICON CARBIDE

BACKGROUND OF THE INVENTION

The invention relates to a process for producing oxygen-free or low-oxygen shaped articles or bodies of silicon carbide, in particular SiC fibers, using chemically reactive polysilanes or polycarbosilanes as precursors.

The production of SiC fibers using polycarbosilanes is known. Thus, for example, by pyrolysis of polydimethylsilanes, methyl-containing polycarbosilanes are initially produced, which are spun into fibers and are stabilized by oxidation, whereby a Si-O containing support layer is formed. The treatment with oxygen causes the resulting pyrolyzed SiC fiber to have an $SiO_2$ content of 20% However, when the fiber is subjected to thermal stress, this high proportion of Si-O bonds leads to deterioration of its mechanical properties and thus to destruction of the fiber.

It is generally true that the stability of an SiC fiber at temperatures>1000° C. decreases dramatically as the oxygen content increases.

In accordance with U.S. Pat. Nos. 3,052,430 and 4,100,233, polysilanes are thermally transformed to polycarbosilanes, and these are then spun into green fibers and pyrolyzed under vacuum for 2 to 48 hours at temperatures of from 350° to 400 ° C. Stabilization of the fiber form is likewise effected by oxidation at 50° to 400 ° C.

U.S. Pat. Nos. 4,220,600 and 4,283,376 describe processes for producing SiC fibers which utilize polycarbosilanes containing SiO in their molecular skeletons as starting materials. Polycarbosilanes of this type are obtained by pyrolysis of polysilanes in the presence of 0.01 to 15 wt-% added polyborosiloxane. Stabilization of the spun fibers is likewise effected by heating in an oxidizing atmosphere at temperatures between 50° and 400 ° C., whereby Si-O bonds are formed.

Stabilization by exposure to gamma-radiation or electron-radiation in an oxidizing or non-oxidizing atmosphere is likewise described.

According to U.S. Pat. No. 4,737,552 a mixture of polycarbosilane, a catalyst for hydrosilation, and an unsaturated compound are spun into a green fiber which is rendered infusible by thermal treatment at temperatures of 150° to 400 ° C. in an inert atmosphere or in a vacuum and subsequently pyrolyzed.

U.S. Pat. No. 5,171,722 starts from a solution of a polycarbosilane, a polyvinylsilazane, and a catalyst, which preferably generates $H_2$ or $CH_3$ radicals. Green fibers spun from the solution are heated in the temperature range from 25° to 200 ° C. for a period of time from 0.5 to 24 hours and stabilized. The subsequent pyrolysis takes place at 600° to 1000 ° C. under an inert atmosphere or in a vacuum.

Published European Patent Application No. EP 496,574 describes the production of SiC fibers with a low oxygen content. In this case the stabilization of the fiber backbone takes place during thermal treatment of a green polycarbosilane fiber in an atmosphere of hydrocarbons, halogenated hydrocarbons, or unsaturated hydrocarbons.

All of the aforementioned processes have in common the need to stabilize the form of the spun green fiber, that is to make it infusible. The method used on an industrial scale is oxidative protection of the green fibers. However, due to the effects of oxygen, the thermal resistance of the SiC fibers is sharply decreased, so that the fibers are not suitable for use at high temperatures.

The possibility of stabilizing the fibers by exposure to radiation is very cost intensive, and it is therefore utilized only for limited industrial fields of application or at laboratory scale.

SUMMARY OF THE INVENTION

It is the object of the invention to produce oxygen-free or low-oxygen shaped bodies of silicon carbide which exhibit superior mechanical properties at high temperatures.

This and other objects of the invention are achieved by providing a process for producing an oxygen-free or low-oxygen formed article of silicon carbide comprising the steps of forming a polymeric organo-silicon compound with chemically reactive centers under inert conditions into an article having a desired shape; stabilizing the shape of the formed article by a treatment selected from the group consisting of (a) reacting the polymeric organo-silicon compound with a gaseous cross-linking agent; and (b) subjecting the polymeric organo-silicon compound to a thermal cross-linking treatment at a temperature below the softening temperature of the polymeric compound; and thereafter pyrolyzing the stabilized article at a temperature greater than 1000° C. in an inert atmosphere under anaerobic conditions.

As used herein, the term "low-oxygen" refers to an oxygen content of less than 2 wt-%.

DETAILED DESCRIPTION OF PREFERRED EMBODIMENTS

The invention relates to a process in which polymeric organo-silicon compounds, e.g. polysilanes or polycarbosilanes, with chemically reactive centers are spun under inert conditions, and thereafter are stabilized preferably in the presence of reactive gases, e.g. ammonia or methylamine, in pure form or in admixture with argon, or are stabilized by thermal treatment at a temperature under the melting point of the respective polycarbosilane, and are subsequently pyrolyzed at temperatures greater than 1000° C. under anaerobic conditions in an inert atmosphere.

The polymeric organo-silicon compounds which are utilized in accordance with the invention for producing shaped SiC bodies, particularly SiC fibers, can be divided into the following groups:

a) polycarbosilanes composed of structural units corresponding to the general formula I

wherein $R^1$ represents halogen, preferably chlorine, hydrogen, straight chain or branched C1 to C6 alkyl, C1 to C6 cycloalkyl, aryl or arylalkyl in which the alkyl groups are straight chain or branched and contain from 1 to 6 carbon atoms, and $R^1$ may have differing meanings in different units of a single polycarbosilane;

$R^2$ represents halogen, preferably chlorine, straight chain or branched C1 to C6 alkyl, C1 to C6 cycloalkyl, aryl or arylalkyl in which the alkyl groups are straight chain or branched and contain 1 to 6 carbon atoms, and $R^2$ may have differing meanings in different units of a single polycarbosilane; and A contains from 1 to 6 carbon atoms and represents a straight-chained or branched alkylene group, or an arylene group, or a substituted arylene group, or a cycloalkylene group, and A may have differing meanings in different units of a single polycarbosilane.

These polycarbosilanes are produced in accordance with the process described in U.S. Pat. Nos. 5,087,685; 5,132,375; 5,204,434; and 5,247,028, the disclosures of which are incorporated herein by reference.

b) Polysilanes or polycarbosilanes composed of structural units corresponding to the general formula II

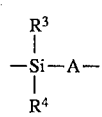

(II)

wherein $R^3$ represents halogen, preferably chlorine, hydrogen, alkyl, cycloalkyl, aryl, arylalkyl, silyl, or silylene, and $R^3$ may have differing meanings in different units of a single polycarbosilane;

$R^4$ represents halogen, preferably chlorine, hydrogen, alkyl, cycloalkyl, aryl, arylalkyl, silyl, or silylene, and $R^4$ may have differing meanings in different units of a single polycarbosilane; and A represents a silylene group, a straight-chain or branched alkylene group, a cycloalkylene group, an arylene group, a substituted arylene group, or a complex-stabilized metal, preferably titanium, zirconium, or tungsten stabilized with, for example pentamethylcyclopentadienyl [cp*] or cyclopentadienyl [cp], and A may have differing meanings in different units of a single polycarbosilane.

These polysilanes are produced by catalytic disproportionation of disilanes, for example in accordance with the process disclosed in Published German Patent Application No. DE 4,207,299 using a heterogenous catalyst with organoaminophosphinoxide groups attached to the surface of a silicate carrier material or by homogeneous reaction in the presence of tetramethylene diamine [TMEDA].

Polymers having significantly improved spinability are produced by catalytic disproportionation of disilanes, which preferably contain chlorine, in the presence of olefins.

Likewise, a second element which forms carbides can be built into the polysilane/polycarbosilane backbone, preferably a transition element from the fourth through sixth subsidiary groups of the periodic table of elements. For this purpose a mixture of methylchlorodisilanes and cyclopentadienyl compounds of, for example, titanium, zirconium or tungsten, is utilized in the for the disproportionation reaction. Olefins can likewise be contained in this mixture.

c) polycarbosilanes composed of structural units corresponding to the general formula III

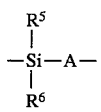

(III)

wherein $R^5$ represents halogen, preferably chlorine, hydrogen, alkyl, cycloalkyl, aryl, arylalkyl, alkenyl, preferably vinyl, cycloalkenyl, alkynyl, preferably ethynyl, propargyl, or cycloalkynyl, and $R^5$ may have differing meanings in different units of a single polycarbosilane;

$R^6$ represents halogen, preferably chlorine, alkyl, cycloalkyl, aryl, arylalkyl, alkenyl, preferably vinyl, cycloalkenyl, alkynyl, preferably ethynyl, propargyl, or cycloalkynyl, and $R^6$ may have differing meanings in different units of a single polycarbosilane; and A represents a straight-chain or branched alkylene group, a cycloalkylene group, an alkenylene group, an alkynylene group, an arylene group, or a substituted arylene group, and A may have differing meanings in different units of a single polycarbosilane.

These polycarbosilanes are reacted by Grignard reactions of partially or completely halogenated, preferably chlorinated, polycarbosilanes corresponding to the general formula I into the corresponding partially or fully alkenylated or alkynylated compounds. In particular, fully halogenated $Si(hal)_2$-A educts are partially alkenylated or alkynylated.

In one preferred embodiment, $Si(hal)_{2-x}(R)_x$-A products are produced in which hal is chlorine or bromine and R is alkenyl, alkynyl, cycloalkenyl, or cycloalkynyl.

The alkenyl and alkynyl groups together with the halogens on the silicon atoms constitute reactive polymer reaction centers which can be converted into a highly cross-linked state which is stabilized with respect to form, e.g. by thermal treatment at temperatures under the melting point of the respective polymer or by exposure to electromagnetic radiation. This combination of an unsaturated group (i.e. an alkenyl or alkynyl group) and at least one halogen atom on an adjacent silicon atom which is capable of being converted into a form-stabilized and cross-linked condition is what constitutes a "chemically reactive center" as that term is used in the present description and claims. The aforementioned stabilization is promoted by the presence of known catalysts which form radicals, e.g. dicumyl peroxide, benzoyl peroxide, or di-t-butyl peroxide.

In a preferred embodiment of the invention, the stabilization is effected in the presence of reactive gases.

In one preferred embodiment for producing polysilanes corresponding to formula II, the starting materials used for the catalytic disproportionation are methylchlorodisilane, olefins and catalytically active compounds which have basic, nucleophilic properties and characteristic redox behavior, e.g. derivatives of hexamethylphosphoric acid triamide (HMPT) which are fixed on a support or carrier, or for the homogeneous reaction, tetramethylenediamine (TMEDA).

For example, the reaction of 1,1,2,2-tetrachlorodimethylsilane with styrene can be carried out either in a heterogeneously catalyzed variant with catalysts according to Published German Patent Application No. 4,207,299, or homogeneously with TMEDA.

The silicon/carbon ratio and the chlorine content of the resulting copolymer of silane and styrene can be controlled by adjusting the proportion of styrene in the reaction mixture. The physical properties of the reaction products, such as, for example, flow behavior, viscoelasticity, and melting range, can also be controlled in this way. The magnitude of these properties is of central importance, particularly with regard to spinning in a melt spinning process. The selection of the catalytic components and of the temperature regime determine the degree of polymerization, the molecular weight, the weight distribution and the degree of cross-linking.

Instead of styrene, one can also utilize other olefins, such as dimethylfulvene, acrylonitrile, divinyl benzene, cyclopentadiene, vinyl-containing silanes, butadiene or isoprene.

The filaments are spun from the aforementioned chemically reactive polysilanes or polycarbosilanes, in that the polymer melt is extruded by pressure through a spinning nozzle, preferably having a capillary diameter of 100 to 300 μm.

Immediately after the nozzle, the filaments are stretched or drawn. A later stretching (restreching) is also possible. The drawn filaments having a diameter between 10 and 25 μm are wound on a spool. The stretching or drawing of the fibers and the take-up of the fiber on the rotating cylinder or spool can be achieved by a single unit, whereby the diameter of the filament is determined by the speed of rotation of the rotating cylinder, which can be adjusted as desired.

In order to avoid oxygen contamination by reaction of the polymer with moisture in the air (ambient humidity), the entire spinning and drawing process should be carried out under an inert atmosphere.

In order to cross-link and thus stabilize the spun filaments, the filaments are treated in accordance with the invention under anaerobic conditions (i.e. in the absence of oxygen) with reactive gases which react with the respective polysilanes or polycarbosilanes being used and lead to cross-linking. Advantageously, ammonia or methylamine or hydrogen sulfide, either in pure form or in gaseous admixture with argon, is used as the reactive gas. An increase in temperature has the effect of accelerating the cross-linking process.

Due to the ongoing cross-linking, temperatures above the melting range of the polymers can also be used.

For example, the following cross-linking reactions lead to stabilization of the form of the filaments:

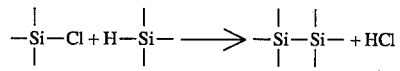

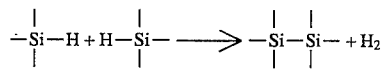

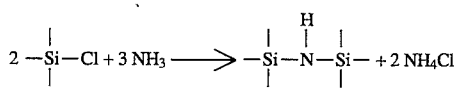

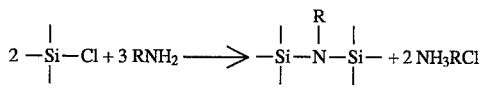

The cross-linked filaments are pyrolyzed under anaerobic conditions in the presence of argon or of another inert atmosphere at heating rates of from 1° to 20° K./min., preferably about 10° C./min., at temperatures greater than 1000° C. Preferably temperatures between 1000° and 1200° C. are used. The silicon carbide fibers obtained as a result of the pyrolysis are composed of amorphous, incompletely crystallized or completely crystallized silicon carbide.

The silicon carbide fibers produced in accordance with the invention exhibit tensile strengths of more than 1 GPa and moduli of elasticity (E-moduli) of more than 150 GPa. The oxygen content is less than 2% (by weight). Values in the range from 0.2 to 0.5 percent are generally achievable.

The principal component of the fibers is silicon carbide; small amounts of free carbon (e.g. less than 2%) and nitrogen (e.g. less than 4%) may be present.

The silicon carbide fibers according to the present invention may be subjected to temperatures up to at least 1,500° C. without any negative effect on the strength of the fibers. Even exposure to temperatures up to 1,800° C. do not have a negative effect on the properties of the fibers. Even in an oxidizing atmosphere, the fibers can be used at temperatures up to 1,400° C. In such a case a silicon dioxide layer forms on the fiber, so that deterioration of the fiber properties is inhibited.

Example 1: Disproportionation with TMEDA.

In a sulfurization retort equipped with a magnetic stirrer, an internal thermometer, a reflux condenser or reflux cooler and an inert gas inlet, methylchlorodisilane and styrene were mixed with each other in a desired ratio, preferably 5 to 50 mass-% (styrene) with respect to the amount of the disilane utilized, and disproportionated after addition of 1 mass-% TMEDA with respect to the amount of methylchlorodisilane utilized. Styrene was simultaneously captured as a building block of the copolymer. The reaction mixture was maintained for two hours at reflux at 138° to 148° C. After the mixture had cooled, the resulting methylchlorosilane was distilled off, while sump temperatures above 140° C. were avoided. Subsequently, the mixture was refluxed again for two hours at 170° to 180° C., and the monosilane and unreacted styrene were then distilled off. The sump temperature should not exceed 240° C. After cooling, the shorter chain portions of the reaction product was distilled off under vacuum (66.65 to 133.3 Pa) at 150° C. The yield of polymer was 40 to 80 mass-% with respect to the amount of starting mixture.

Example 2: Heterogeneously catalyzed disproportionation in the presence of styrene.

200 g of methylchlorodisilane mixture were mixed in a desired ratio with styrene (preferably 5 to 50 mass-% styrene with reference to the amount of methylchlorodisilane used) in a sulfurization retort equipped with a stirrer, a heating element, an inert gas inlet, and a packed column having a Ketyl-bridge and reflux cooler mounted thereon. The packed column contained 30 g of catalyst according to published German Patent Application No. DE 4,207,299 and Raschig rings.

The reaction mixture was brought to boiling (145° to 156° C.). The reactants contacted the catalyst in the gas phase. The methylchlorosilanes formed when the methylchlorodisilane reacts at the catalyst are gaseous at these reaction temperatures. The reaction system was maintained at full reflux for one hour. The sump temperature thereby decreased to 90° to 110° C. From then on the reflux was decreased by continuous withdrawal of the methylchlorosilanes. The sump temperature necessarily increased. The sump temperature was thus slowly increased to 300° C. Highly cross-linked poly(silane-co-styrene) formed. If the reaction was ended at 200° C., weakly cross-linked polysilastyrene could be recovered, which likewise exists as a light-yellow solid product at room temperature. The melting temperatures depend on the manner in which the reaction is conducted and lie in the range from 100° to 250° C. The poly(sila-co-styrenes) are soluble in organic solvents, for example toluene, tetrachloroethylene, $CCl_4$, tetrahydrofuran, $CHCl_3$, or dioxane. The yield of polymer amounted to approximately 60 to 70 mass-% with respect to the starting mixture.

Example 3: Disproportionation in the presence of transition metal complexes.

The reaction was carried out in a manner analogous to Example 1 or Example 2.

In place of styrene the disilane was reacted with dicyclopentadienyl titanium dibromide or dicyclopentadienyl zirconium dibromide. In modifications, other halogens, alkyl groups, aryl groups or hydrogen could be used in place of the bromine substituents.

Example 4: Production of allyl-containing polycarbosilanes.

4.45 g of magnesium chips in 20 mm absolute diethyl ether were introduced under a protective gas atmosphere into a standard apparatus consisting of a 1000 ml three-neck flask equipped with two dropping funnels, a reflux cooler and a stirring core. The dropping funnels were filled with a solution of 15.4 g allyl chloride in 50 ml absolute diethyl ether, or with a solution of 10 g poly(dichlorosilylene-co-methylene) having a chlorine content of 56.4 wt-% in 50 ml absolute diethyl ether. Thereafter, the allyl chloride solution was slowly dripped in. If no reaction started, the reaction mixture was carefully heated, or a little iodine was added. After the reaction started, the polycarbosilane solution was dripped in together with the allyl chloride solution. If the generation of heat becomes to vigorous, the reaction mixture was cooled with an ice bath without interrupting the reaction. After the addition of reactants was completed, an additional 200 ml of solvent were added. the reaction solution was subsequently stirred at room temperature for 2 to 3 days. Thereafter, the reaction solution was transferred to 700 ml of an ice-cooled aqueous ammonium chloride solution. The organic phase was separated in a separating funnel and filtered. The filtrate was concentrated in a rotary evaporator, and the remaining residue was taken up in methylene chloride. The solution was filtered again, concentrated in the rotary evaporator, and the product was dried under vacuum at 50° C. A 75 to 80 percent yield of light-yellow, viscous product was obtained.

Example 5: Production of vinyl-containing polycarbosilanes.

50 ml of absolute diethyl ether were introduced under a protective gas atmosphere into a standard apparatus consisting of a 1000 ml three-neck flask equipped with two dropping funnels, a reflux cooler, and a stirring core. The dropping funnels were filled with 180 ml of a 1.0 molar solution of vinyl magnesium bromide in tetrahydrofuran (THF), or with a solution of 10 g poly(dichlorosilylene-co-methylene) having a chlorine content of 56.4 wt-% in 50 ml absolute diethyl ether. Thereafter, the polycarbosilane solution was dripped in slowly together with the Grignard solution while cooling in an ice bath. After the addition was completed, an additional 200 ml of absolute diethyl ether were added. The reaction mixture was subsequently stirred at room temperature for 2 to 3 days. The reaction solution was transferred into 700 ml of an ice-cooled, aqueous ammonium chloride solution. Insoluble material was filtered out; the organic phase was separated in separating funnel and concentrated in a rotary evaporator. The remaining residue was taken up in methylene chloride and filtered again. Thereafter, the solution was concentrated in a rotary evaporator, and the product was dried in a vacuum at 50° C. The dark-yellow, highly viscous product was obtained in a 75 to 80 percent yield.

Example 6: Spinning.

Polymethylchlorosilane-co-styrene was melted at 100° C. under a protective gas atmosphere (argon) and introduced under anaerobic conditions into the pressure chamber of a spinning apparatus. The polysilane was extruded through the spinning nozzle at 130° C. and an extrusion pressure of 25 to 30 bar. High purity inert gas (nitrogen or argon) was utilized as the pressure medium. The spinning nozzle had a capillary diameter of 200 μm. The capillary length/diameter ratio was 2:1 or 3:1. The nozzle inlet temperature was 60° C. in order to reduce turbulent flow. The filaments formed at the nozzle outlet were taken up by the stretching device. Due to the speed of rotation of the spool of the stretching device the fiber filaments were stretched to a diameter of 10 to 25 μm.

Example 7: Form stabilization.

The green fibers from Example 6 were introduced into a gas-tight container with gas inlet and outlet lines. The container was heated externally at 1° K. per minute to 150° C. At the beginning of this form stabilization process, a temperature at least 30° K. under the melting temperature should not be exceeded in order to avoid undesired sticking of the filaments. The stabilization process was begun at 60° C. The container was flushed with the reactive gas mixture (5 liters/hour). A mixture of 90 vol-% argon and 10 vol-% ammonia was utilized as the reactive gas. The temperature was maintained at 150° C. for one hour.

Example 8: Pyrolysis.

The fibers of Example 6 which had been stabilized as to their form were introduced into a closable corundum tube and placed in an oven which had been flushed with argon. With a heat-up phase of 5° K. per minute, the fibers were pyrolyzed over a time period of one hour at 1100° C.

X-ray phase analysis showed that the resulting fibers were composed of nanocrystalline β-silicon carbide with an average crystal size of 1.6 nm. Oxygen analysis by the combustion method indicated an oxygen content of 2 percent in the fibers. Infrared spectroscopic examination showed exclusively Si-C bond vibrations. A determination of the carbon content, which likewise was carried out be combustion analysis, showed only very small amounts of free carbon. The carbon contents were determined to be between 1 and 2 percent.

Investigations of the thermal resistance by means of thermoanalytical methods did not show any significant loss of mass at temperatures up to 1,600° C. under an inert atmosphere (nitrogen or argon). No damage to the fibers, such as pores, cracks or spalling, could be observed by REM investigation (electron microscope).

Y-axis: transmission

X-axis: wavenumber in cm$^{-1}$

TABLE 1

Figure 1:
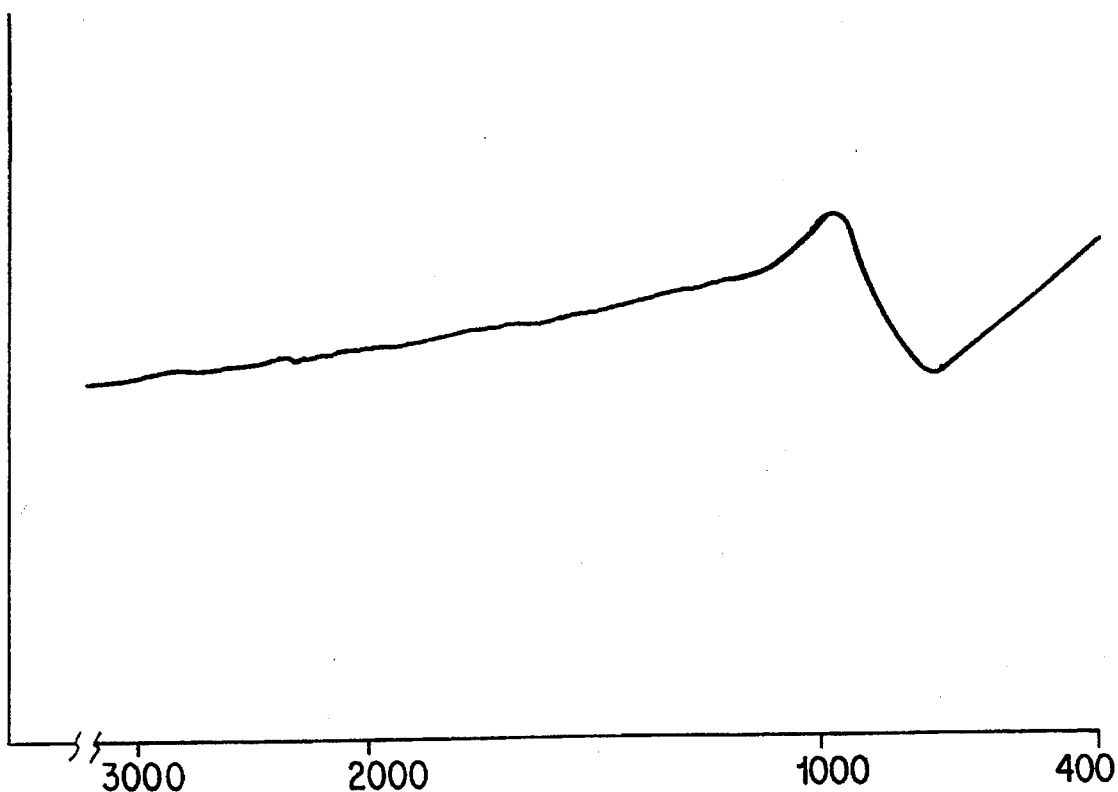
FIG. 1 shows an infrared (IR) spectrum of poly(methylchlorosilane-co-styrene) which was pyrolyzed at 1000° C. The Si-C stretching vibrations in the region from 900 to 650 cm$^{-1}$ can clearly be seen.

Polycarbosilanes produced by disproportionation according to Examples 1 through 3.

| Sample No. | Polycarbosilane | Reactant II | Proportions | Catalyst | Si mass-% | C mass-% | Cl mass-% | H mass-% | Yield mass-% |
|---|---|---|---|---|---|---|---|---|---|
| 1 | poly(silane-co-styrene) | styrene | 5:1 | TMEDA***) | 23.27 | 38.3 | 33.24 | 4.94 | 49 |
| 2 | poly(silane-co-styrene) | styrene | 4:1 | TMEDA***) | 22.73 | 39.78 | 30.37 | 5.15 | 55 |
| 3 | poly(silane-co-styrene) | styrene | 3.3:1 | TMEDA***) | 21.15 | 45.1 | 28.11 | 5.23 | 65 |
| 4 | poly(silane-co-styrene) | styrene | 2.5:1 | TMEDA***) | 18.4 | 48.95 | 26.41 | 5.92 | 72 |

TABLE 1-continued

Polycarbosilanes produced by disproportionation according to Examples 1 through 3.

| Sample No. | Polycarbosilane | Reactant II | Proportions | Catalyst | Si mass-% | C mass-% | Cl mass-% | H mass-% | Yield mass-% |
|---|---|---|---|---|---|---|---|---|---|
| 5 | poly(silane-co-styrene) | styrene | 2:1 | TMEDA***⁾ | 17.5 | 51.4 | 24.05 | 6.05 | 77 |
| 6 | copolym. DSF/dimethyl fulvene | cyclopentadiene | 3:1 | TMEDA***⁾ | 36.75 | 35.3 | 19.98 | 4.92 | 43 |
| 7 | copolym. DSF/dimethyl fulvene | dimethylfulvene | 5:1 | TMEDA***⁾ | 21.51 | 45.52 | 27.08 | 5.02 | 33 |
| 8 | copolym. DSF/(cp)₂ZrBr₂ | (cp)₂ZrBr₂ | 10:1 | TMEDA***⁾ | 35.1 | 35.9 | 23.48 | 4.9 | 20 |
| 9 | copolym. DSF/dimethyl fulvene | dimethylfulvene | 5:1 | *⁾ | 22.73 | 49.8 | 20.29 | 5.6 | 25 |
| 10 | poly(silane-co-styrene) | styrene | 4:1 | *⁾ | 23.96 | 52.2 | 17.15 | 6.3 | 69.3 |

*⁾Catalyst according to DE 4,207,299
**⁾Proportions with reference to the disilane fraction in grams
***⁾Homogeneous catalysis with 1 mass-% catalyst with reference to the methylchlorodisilane mixture used.
DSF Disilane fraction

TABLE 2

Dependence of the tensile strength and the modulus of elasticity (E-modulus) on the pyrolysis temperature of fibers produced from poly(silane-co-styrene) No. 10.

| Fiber Production Temperature | Tensile Strength | Modulus of Elasticity |
|---|---|---|
| 900° C. | 1.1 GPa | 180 GPa |
| 1000° C. | 1.7 GPa | 204 GPa |
| 1100° C. | 2.2 GPa | 260 GPa |
| 1200° C. | 1.9 GPa | 253 GPa |

TABLE 3

Thermal Resistance of SiC fibers produced at 1100° C. in an argon atmosphere.

| Exposure Temperature | Tensile Strength | Modulus of Elasticity |
|---|---|---|
| 1400° C. | 2.0 GPa | 261 GPa |
| 1600° C. | 2.0 GPa | 258 GPa |
| 1700° C. | 1.9 GPa | 257 GPa |
| 1800° C. | 1.7 GPa | 252 GPa |

The foregoing description and examples have been set forth merely to illustrate the invention and are not intended to be limiting. Since modifications of the described embodiments incorporating the spirit and substance of the invention may occur to persons skilled in the art, the invention should be construed broadly to include everything within the scope of the appended claims and equivalents thereof.

What is claimed is:

1. A process for producing an oxygen-free or low-oxygen formed article of silicon carbide comprising the steps of:

forming under inert conditions a material consisting essentially of a polymeric organo-silicon compound with chemically reactive centers comprising an unsaturated group adjacent a silicon atom which carries a halogen atom into a formed article having a desired shape, said formed article consisting essentially of said organo-silicon compound with chemically reactive centers;

stabilizing the shape of the formed article consisting essentially of said organo-silicon compound with chemically reactive centers by a treatment selected from the group consisting of a) reacting the polymeric organo-silicon compound with a gaseous cross-linking agent selected from the group consisting of ammonia, primary amines and hydrogen sulfide; and b) subjecting the polymeric organo-silicon compound to a thermal cross-linking treatment at a temperature below the softening temperature of the polymeric compound; and thereafter pyrolyzing the stabilized article at a temperature greater than 1000° C. in an inert atmosphere under anaerobic conditions.

2. A process according to claim 1, wherein said forming step comprises spinning the organo-silicon compound into a fiber.

3. A process according to claim 1, wherein said organo-silicon compound is selected from the group consisting of polysilanes and polycarbosilanes.

4. A process according to claim 1, wherein said organo-silicon compound is a polysilane or polycarbosilane composed of structural units corresponding to the formula I $$-\underset{\underset{R^2}{|}}{\overset{\overset{R^1}{|}}{Si}}-A-\quad (I)$$

wherein

R¹ represents halogen, hydrogen, alkyl, cycloalkyl, aryl or arylalkyl, and R¹ may have differing meanings in different units of a single polycarbosilane;

R² represents halogen, alkyl, cycloalkyl, aryl or arylalkyl, and R² may have differing meanings in different units of a single polycarbosilane; and A represents a straight-chained or branched alkylene group, or an arylene group, or a substituted arylene group, or a cycloalkylene group, and A may have differing meanings in different units of a single polycarbosilane.

5. A process according to claim 4, wherein R¹ represents chlorine.

6. A process according to claim 4, wherein R² represents chlorine.

7. A process according to claim 1, wherein said organo-silicon compound is a polysilane or polycarbosilane produced by catalytic disproportionation of a disilane and composed of structural units corresponding to the formula II

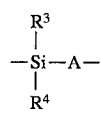

(II)

wherein

R³ represents halogen, hydrogen, alkyl, cycloalkyl, aryl, arylalkyl, silyl, or silylene, and R³ may have differing meanings in different units of a single polycarbosilane;

R⁴ represents halogen, hydrogen, alkyl, cycloalkyl, aryl, arylalkyl, silyl, or silylene, and R⁴ may have differing meanings in different units of a single polycarbosilane; and A represents a silylene group, a straight-chain or branched alkylene group, a cycloalkylene group, an arylene group, a substituted arylene group, or a complex-stabilized metal, and A may have differing meanings in different units of a single polycarbosilane.

8. A process according to claim 7, wherein R³ represents chlorine.

9. A process according to claim 7, wherein R⁴ represents chlorine.

10. A process according to claim 7, wherein A represents titanium, zirconium, or tungsten stabilized by complexing with pentamethylcyclopentadienyl or cyclopentadienyl ligands.

11. A process according to claim 1, wherein said organo-silicon compound is a polycarbosilane composed of structural units corresponding to the formula III

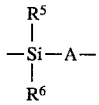

(III)

wherein

R⁵ represents halogen, hydrogen, alkyl, cycloalkyl, aryl, arylalkyl, alkenyl, cycloalkenyl, alkynyl, or cycloalkynyl, and R⁵ may have differing meanings in different units of a single polycarbosilane;

R⁶ represents halogen, alkyl, cycloalkyl, aryl, arylalkyl, alkenyl, cycloalkenyl, alkynyl, or cycloalkynyl, and R⁶ may have differing meanings in different units of a single polycarbosilane; and A represents a straight-chain or branched alkylene group, a cycloalkylene group, an alkenylene group, an alkynylene group, an arylene group, or a substituted arylene group, and A may have differing meanings in different units of a single polycarbosilane.

12. A process according to claim 11, wherein R⁵ represents chlorine.

13. A process according to claim 11, wherein R⁵ represents a vinyl, ethynyl, or propargyl group.

14. A process according to claim 11, wherein R⁶ represents chlorine.

15. A process according to claim 11, wherein R⁶ represents a vinyl, ethynyl, or propargyl group.

16. A process according to claim 1, wherein the formed article is stabilized by reaction with a gaseous agent selected from the group consisting of ammonia, methylamine, hydrogen sulfide.

17. A process according to claim 16, wherein said gaseous agent is admixed with argon.

18. A process according to claim 16, wherein a chamber containing the formed article is flushed with said gaseous agent in substantially pure form.

19. A process according to claim 1, wherein the formed article is stabilized by reaction with a gaseous agent under anaerobic conditions.

20. A process according to claim 19, wherein the formed article is stabilized by gradual heating in the presence of said gaseous agent to a temperature below the melting temperature of the polymerized organo-silicon compound.

* * * * *